United States Patent
Moh et al.

(10) Patent No.: US 8,055,936 B2
(45) Date of Patent: Nov. 8, 2011

(54) SYSTEM AND METHOD FOR DATA RECOVERY IN A DISABLED INTEGRATED CIRCUIT

(75) Inventors: Sungwon Moh, Wilton, CT (US); Peter A. Pagliaro, Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 246 days.

(21) Appl. No.: 12/347,772

(22) Filed: Dec. 31, 2008

(65) Prior Publication Data

US 2010/0165734 A1 Jul. 1, 2010

(51) Int. Cl.
*G06F 11/00* (2006.01)
(52) U.S. Cl. .......................................... 714/5.1
(58) Field of Classification Search .................. None
See application file for complete search history.

(56) References Cited

U.S. PATENT DOCUMENTS

| | | | |
|---|---|---|---|
| 4,253,158 A | 2/1981 | McFiggans | |
| 4,310,755 A | 1/1982 | Miller | |
| 4,376,299 A | 3/1983 | Rivest | |
| 4,649,266 A | 3/1987 | Eckert | |
| 4,908,502 A * | 3/1990 | Jackson | 235/437 |
| 5,111,030 A | 5/1992 | Brasington et al. | |
| 5,260,979 A * | 11/1993 | Parker et al. | 375/366 |
| 5,400,345 A | 3/1995 | Ryan, Jr. | |
| 5,715,431 A | 2/1998 | Everett et al. | |
| 5,731,980 A | 3/1998 | Dolan et al. | |
| 5,749,078 A | 5/1998 | Gargiulo et al. | |
| 5,774,399 A | 6/1998 | Kwon | |
| 5,793,867 A | 8/1998 | Cordery et al. | |
| 5,812,990 A | 9/1998 | Ryan, Jr. et al. | |
| 5,841,269 A | 11/1998 | Schoonmaker et al. | |
| 5,938,779 A | 8/1999 | Preston | |
| 5,963,928 A | 10/1999 | Lee | |
| 5,978,275 A | 11/1999 | Song et al. | |
| 5,999,921 A | 12/1999 | Arsenault et al. | |
| 6,000,774 A | 12/1999 | Nambudiri | |
| 6,050,486 A | 4/2000 | French et al. | |
| 6,061,670 A | 5/2000 | Brand | |
| 6,067,262 A | 5/2000 | Irrinki et al. | |
| 6,085,180 A | 7/2000 | Beer et al. | |
| 6,125,162 A | 9/2000 | English et al. | |

(Continued)

FOREIGN PATENT DOCUMENTS

EP 0302453 A1 8/1988

(Continued)

OTHER PUBLICATIONS

The European Search Report for European Patent Appplication No. 09015327.1.

(Continued)

*Primary Examiner* — Robert Beausoliel, Jr.
*Assistant Examiner* — Neil Miles
(74) *Attorney, Agent, or Firm* — George M. Macdonald; Charles R. Malandra, Jr.; Steven J. Shapiro

(57) ABSTRACT

Systems and methods for providing memory access circuitry in application specific integrated circuits, and in certain configurations for recovering data from non-volatile memory registers in a partially disabled application specific integrated circuit as provided. In one configuration, a virtual partial dual-port non-volatile memory is provided having a secondary partial read only port. In another configuration, a physical partial dual-port non-volatile memory is provided having a secondary partial read only port.

27 Claims, 4 Drawing Sheets

U.S. PATENT DOCUMENTS

| | | | |
|---|---|---|---|
| 6,141,654 A | 10/2000 | Heiden et al. | |
| 6,144,950 A | 11/2000 | Davies et al. | |
| 6,169,804 B1 | 1/2001 | Ryan, Jr. et al. | |
| 6,175,826 B1 | 1/2001 | Malandra, Jr. et al. | |
| 6,202,057 B1 | 3/2001 | Pierce | |
| 6,260,144 B1 | 7/2001 | Pitchenik et al. | |
| 6,295,359 B1 | 9/2001 | Cordery et al. | |
| 6,388,930 B1* | 5/2002 | Obremski | 365/201 |
| 6,397,328 B1 | 5/2002 | Pitchenik et al. | |
| 6,585,433 B2 | 7/2003 | Davies et al. | |
| 6,591,327 B1 | 7/2003 | Briner et al. | |
| 6,592,027 B2 | 7/2003 | Kovlakas | |
| 6,629,268 B1 | 9/2003 | Arimilli et al. | |
| 6,839,695 B2 | 1/2005 | Igval | |
| 6,868,407 B1 | 3/2005 | Pierce | |
| 6,928,027 B2 | 8/2005 | Li | |
| 6,941,284 B2* | 9/2005 | DeFilippo et al. | 705/62 |
| 7,143,068 B2 | 11/2006 | Kissner et al. | |
| 7,194,443 B1 | 3/2007 | Post et al. | |
| 7,233,930 B1 | 6/2007 | Ryan, Jr. | |
| 7,237,149 B2* | 6/2007 | Moyer et al. | 714/30 |
| 7,247,791 B2 | 7/2007 | Kulpa | |
| 7,272,581 B2 | 9/2007 | Athens et al. | |
| 7,293,197 B2* | 11/2007 | Jadon et al. | 714/14 |
| 7,337,366 B2* | 2/2008 | Taniguchi | 714/39 |
| 7,360,068 B2 | 4/2008 | Borgatti et al. | |
| 7,366,306 B1* | 4/2008 | Trimberger | 380/278 |
| 7,444,546 B2* | 10/2008 | Kimelman et al. | 714/31 |
| 7,487,316 B1* | 2/2009 | Hall et al. | 711/168 |
| 7,609,087 B1* | 10/2009 | Theron | 326/38 |
| 2002/0008428 A1* | 1/2002 | Smola et al. | 307/413 |
| 2002/0029348 A1 | 3/2002 | Du et al. | |
| 2002/0199076 A1* | 12/2002 | Fujii | 711/163 |
| 2003/0172320 A1* | 9/2003 | Mehta et al. | 714/31 |
| 2004/0230735 A1* | 11/2004 | Moll | 710/312 |
| 2005/0138481 A1* | 6/2005 | Taniguchi | 714/38 |
| 2005/0160316 A1* | 7/2005 | Shipton | 714/22 |
| 2005/0278499 A1 | 12/2005 | Durham et al. | |
| 2006/0013044 A1 | 1/2006 | Cheung | |
| 2006/0075282 A1* | 4/2006 | Borkenhagen et al. | 714/5 |
| 2006/0232295 A1* | 10/2006 | Agrawal et al. | 326/38 |
| 2007/0069012 A1* | 3/2007 | Tagawa | 235/382 |
| 2007/0165457 A1 | 7/2007 | Kim | |
| 2007/0168695 A1* | 7/2007 | Chen et al. | 714/4 |
| 2007/0192250 A1* | 8/2007 | Nakamoto et al. | 705/50 |
| 2008/0028234 A1* | 1/2008 | Ducharme | 713/189 |
| 2008/0043558 A1* | 2/2008 | Dixon et al. | 365/225.7 |
| 2008/0054960 A1* | 3/2008 | Becke et al. | 327/157 |
| 2008/0122484 A1* | 5/2008 | Zhu et al. | 326/38 |
| 2008/0232174 A1 | 9/2008 | Cornwell | |
| 2008/0253182 A1 | 10/2008 | Kim et al. | |
| 2008/0263392 A1* | 10/2008 | Fujiwara et al. | 714/5 |
| 2008/0298128 A1 | 12/2008 | Kang et al. | |
| 2008/0307251 A1* | 12/2008 | Rahman et al. | 714/5 |
| 2009/0058462 A1* | 3/2009 | Mason et al. | 326/38 |
| 2009/0094700 A1* | 4/2009 | Goto et al. | 726/26 |
| 2009/0205050 A1* | 8/2009 | Giordano et al. | 726/26 |
| 2009/0210637 A1* | 8/2009 | Yung et al. | 711/154 |
| 2009/0249136 A1* | 10/2009 | Halstvedt et al. | 714/718 |
| 2010/0148856 A1* | 6/2010 | Lui et al. | 327/536 |
| 2010/0169240 A1 | 7/2010 | Tolmie, Jr. et al. | |

FOREIGN PATENT DOCUMENTS

| | | |
|---|---|---|
| EP | 0328062 A2 | 8/1989 |
| EP | 0328062 B1 | 4/1994 |
| WO | WO97/06599 A1 | 2/1997 |

OTHER PUBLICATIONS

The European Search Report for European Patent Appplication No. 09015329.7.

* cited by examiner

SYSTEM AND METHOD FOR DATA RECOVERY IN A DISABLED INTEGRATED CIRCUIT

CROSS REFERENCE TO RELATED APPLICATIONS

This application is related to commonly-owned patent application Ser. No. 12/347,077, entitled "System and Method for Funds Recovery from an Integrated Postal Security Device" and filed contemporaneously herewith by Robert J. Tolmie, Jr., Douglas A. Clark and Mark A. Scribe, which related application is incorporated herein by reference in its entirety.

FIELD OF THE INVENTION

The illustrative embodiments described in the present application relate generally to memory access circuitry in application specific integrated circuits, and more particularly to systems and methods for recovering data from non-volatile memory registers in a partially disabled application specific integrated circuit.

BACKGROUND

Modern electronic systems that are produced in relatively high volume often include application specific integrated circuits (ASICs) in order to reduce chip count, package size, cost and power requirements. ASICs often include entire 32-bit CPU core processors, memory blocks including ROM, RAM, EEPROM, Flash and other large custom logic building blocks that previously would have been separate discrete chips. Such an ASIC is often referred to as a System-on-a-chip (SoC) because of the high level of integration provided.

Several companies provide various ASIC design and production services including Samsung, IBM, Texas Instruments and Toshiba. There are several types of ASICs available that offer certain libraries and standard processes to speed development including standard cell design and gate array design. Additionally, full custom design chips may be designed and procured.

In traditional multi-chip electronic systems, multiple integrated circuits including a processor, memory, non-volatile memory, logic, power distribution, clock or other subsystem are mounted and interconnected on a printed wiring board. In such a device, one or more of the non-memory components may fail when the non-volatile memory circuit is still functioning. In such a case, memory records may be retrieved from the functioning non-volatile memory device such as by removing it from the printed wiring board and for example placing it in a second working printed wiring board.

However, if the electronic component includes a SoC ASIC, then the failure of a portion of the circuit not damaging the non-volatile memory may still render the non-volatile memory record inaccessible. Accordingly, there is a need o provide for recovery of non-volatile memory records in a partially disables application specific integrated circuit.

SUMMARY

The present application describes illustrative embodiments of systems and methods for memory access circuitry in application specific integrated circuits, and more particularly to systems and methods for recovering data from non-volatile memory registers in a partially disabled application specific integrated circuit.

In one configuration, a system on a chip application specific integrated circuit includes a virtual partial dual-port non-volatile memory having a secondary partial read only port that is configured to share the main memory bus and limit access by an address range register. Secondary power, clock and control signals are provided and a state machine performs a serial output of memory data from a range of memory registers.

In another configuration, a system on a chip application specific integrated circuit includes a physical partial dual-port non-volatile memory having a secondary partial read only port configured with a separate partial read only bus that does not include bus contention busy circuitry. Secondary power and clock signals are exclusively provided to a state machine that performs a serial output of memory data from a range of memory registers. Additionally, memory disable and CPU reset circuitry is controlled by the presence of the secondary power signal. In yet another alternative configuration, the physical second port of the non-volatile memory includes a JTAG circuit. Several additional alternative configurations are also described below.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The illustrative embodiments of the present application describe systems and methods for secure memory read access circuitry in application specific integrated circuits, and more particularly to systems and methods for securely recovering data from non-volatile memory registers in a partially disabled application specific integrated circuit.

In the case of a highly integrated electronic system such as a system on a chip (SoC) application specific integrated circuit (ASIC), embedded non-volatile memory (NVM) may be used for storing valuable data. Access to the relevant NVM would be controlled by circuitry resident in the single integrated circuit. Accordingly, access to the valuable data may not be possible if the integrated ASIC fails in such a way as to prevent normal memory access such as through a processor read of the memory device. Moreover, a highly integrated ASIC with multiple functions is more complex and includes more functionality and logic gates. Accordingly, such an ASIC is more likely to fail due to a problem with an unrelated part of the ASIC than would be likely with a multi-chip module. It has been found that a relatively small number of logic gates may be added to such an ASIC to greatly enhance the likelihood that relevant data might be retrieved from a partially failed ASIC using the systems and methods described herein.

In one illustrative configuration, a system on a chip application specific integrated circuit includes a virtual partial dual-port non-volatile memory having a secondary partial read only port that is configured to share the main memory bus and limit access by an address range register. Secondary power, clock and control signals are provided and a state machine performs a serial output of memory data from a range of memory registers. The illustrative embodiments described herein are implemented in a system on a chip application integrated circuit, but alternatively could be implemented using a similar configurable technology such as Field-programmable gate arrays (FPGAs).

Figure 1:
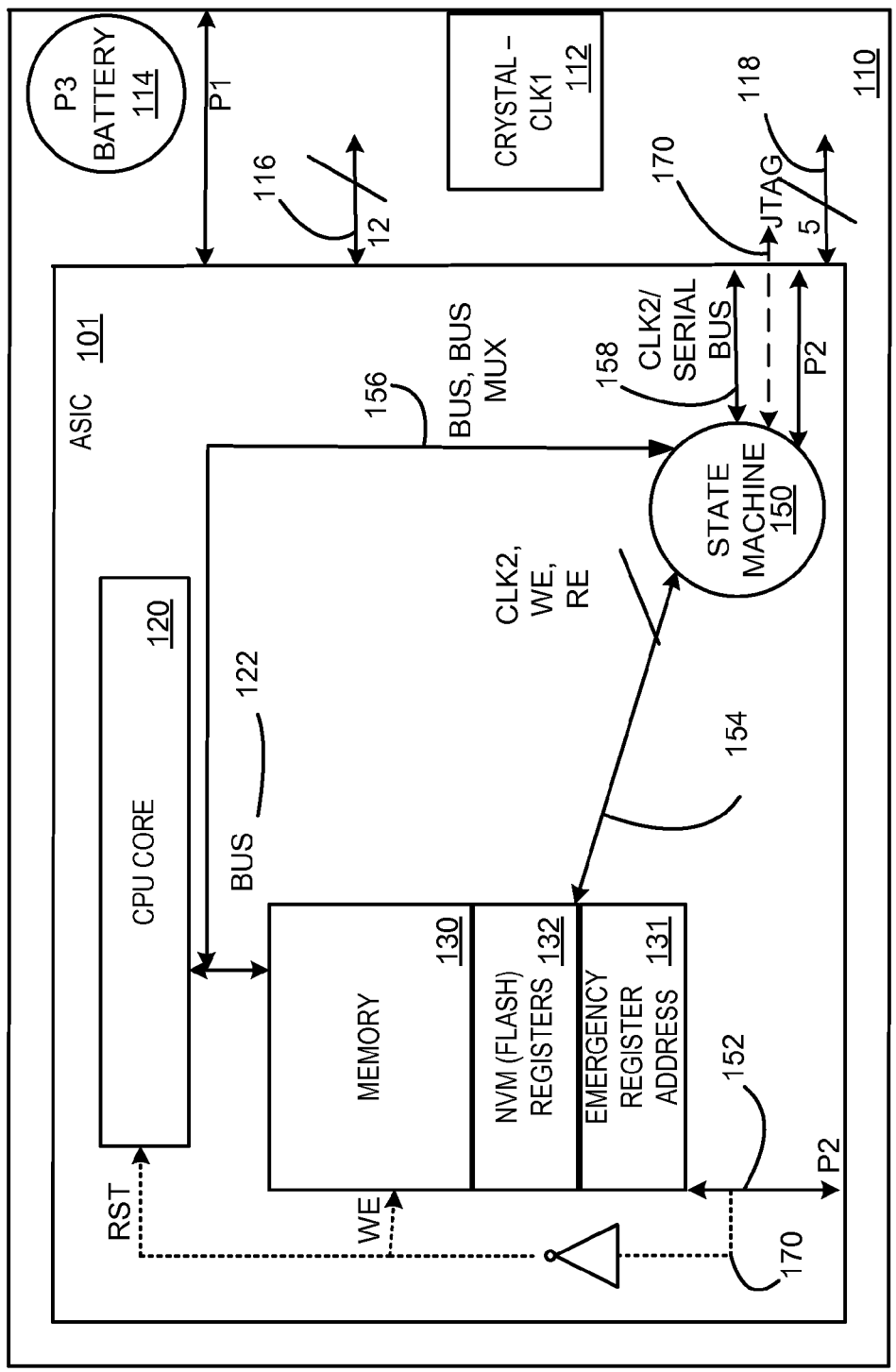
FIG. 1 is a schematic diagram of a system on a chip application specific integrated circuit having a virtual partial dual-port nonvolatile memory according to an illustrative embodiment of the present application.

Referring to FIG. 1, a schematic diagram of a system on a chip application specific integrated circuit 101 having a virtual partial dual-port nonvolatile memory according to an illustrative embodiment of the present application is shown. If an ASIC 101 partially fails, it is possible that valuable data stored in NVM registers 132 will not be accessible though the normal data channel. This embodiment provides a backup virtual partial read-only secondary port into NVM memory 132. Providing a second memory read channel for an emergency read procedure greatly increases the likelihood that the valuable data may be retrieved from a partially disabled ASIC. Removing the ASIC "die" from its package in order to probe internal pads or gates would be extremely difficult and costly as compared to access through a properly configured second channel.

A partial failure of the ASIC may involve the CPU core 120 (such as an ARM 7 core) or support circuitry and therefore, normal access to the NVM memory 132 using BUS1 122 would not be possible. The NVM 132 is implemented using FLASH EEPROM, but a virtual second read only port BUS, BUS MUX 156 is provided by the state machine 150 with multiplexing bus access to provide read only access to the relevant registers. The ASIC 101 is mounted on a representative printed wiring board (PWB) 110 that includes a battery 114 providing power plane P3, a power supply connection providing main power P1, a crystal 112 used to produce a main clock CLK1 and access to the ASIC pins such as through port 116 and header port 118. The header port 118 is an emergency read access port that is not used during normal circuit operation. Similarly, the JTAG port 170 may be externally connected to the state machine 150 or to pins in another area of the ASIC.

The SoC ASIC 101 includes an embedded processor core 120 such as an ARM7 processor core with associated circuitry. Representative BUS 122 (data and address lines) connect the CPU core 120 to a memory map 130 (not to scale) that includes multiple types of integrated memory devices with association bus and signal control circuitry to provide SRAM, Dynamic RAM (DRAM) and/or NVM including EEPROM, Flash 132 (including emergency read address registers 131) or BSRAM devices 132. The ASIC 101 includes relevant support circuitry such as power conditioning and distribution, clock dividers and drivers, test access, main bus control and other relevant devices (not shown). The memory bus 122 is representative and allows multiple access to at least relevant portions of the address and data busses required such as through a second virtual bus and bus arbitrator along line 156 from the bus circuitry of state machine 150.

Here, the ASIC 101 has a separate power plane P2 that has separate power and ground pins on the emergency port 118. This power plane P2 powers only the required FLASH bus and state machine gates required to perform the emergency read functions described herein. However, the state machine 150 and related circuits may also be powered during normal operation by P1. The emergency read port 118 provides certain of the emergency read signals to the PWB 110 header 118. Here, state machine 150 has backup power P2, backup clock CLK2 and a serial bus connected. It provides control write enable WE, read enable and clock CLK2 to the memory over 354. The WE line in 154 is used to disable write functions in the memory. When powered by P2, the state machine 150 obtains the emergency read register address range from hard-coded register location 131. The state machine 150 performs and pre-emergency read functions and then reads and serially outputs the valuable data from the selected range of NVM Registers 132.

Optionally, ASIC 101 is configured to have an automatic write enable disable feature 170 whereby presence of emergency read backup power supply P2 152 drives a gate to disable the write enable on at least the section of memory that holds the valuable data and also drives the reset line of the CPU Core to ensure that the CPU core does not attempt to access the BUS 122. Instead of a state machine 150, the ASIC 101 may alternatively use a small programmed general purpose processor such as an 8 bit 8051 compatible core or other secondary virtual memory access channel device.

In another illustrative configuration, a system on a chip application specific integrated circuit includes a physical partial dual-port non-volatile memory having a secondary partial read only port configured with a separate partial read only bus that does not include bus contention busy circuitry. Secondary power and clock signals are exclusively provided to a state machine that performs a serial output of memory data from a range of memory registers. Additionally, memory disable and CPU reset circuitry is controlled by the presence of the secondary power signal. In yet another alternative configuration, the physical second port of the non-volatile memory includes a JTAG circuit. Several additional alternative configurations are also described below.

Figure 2:
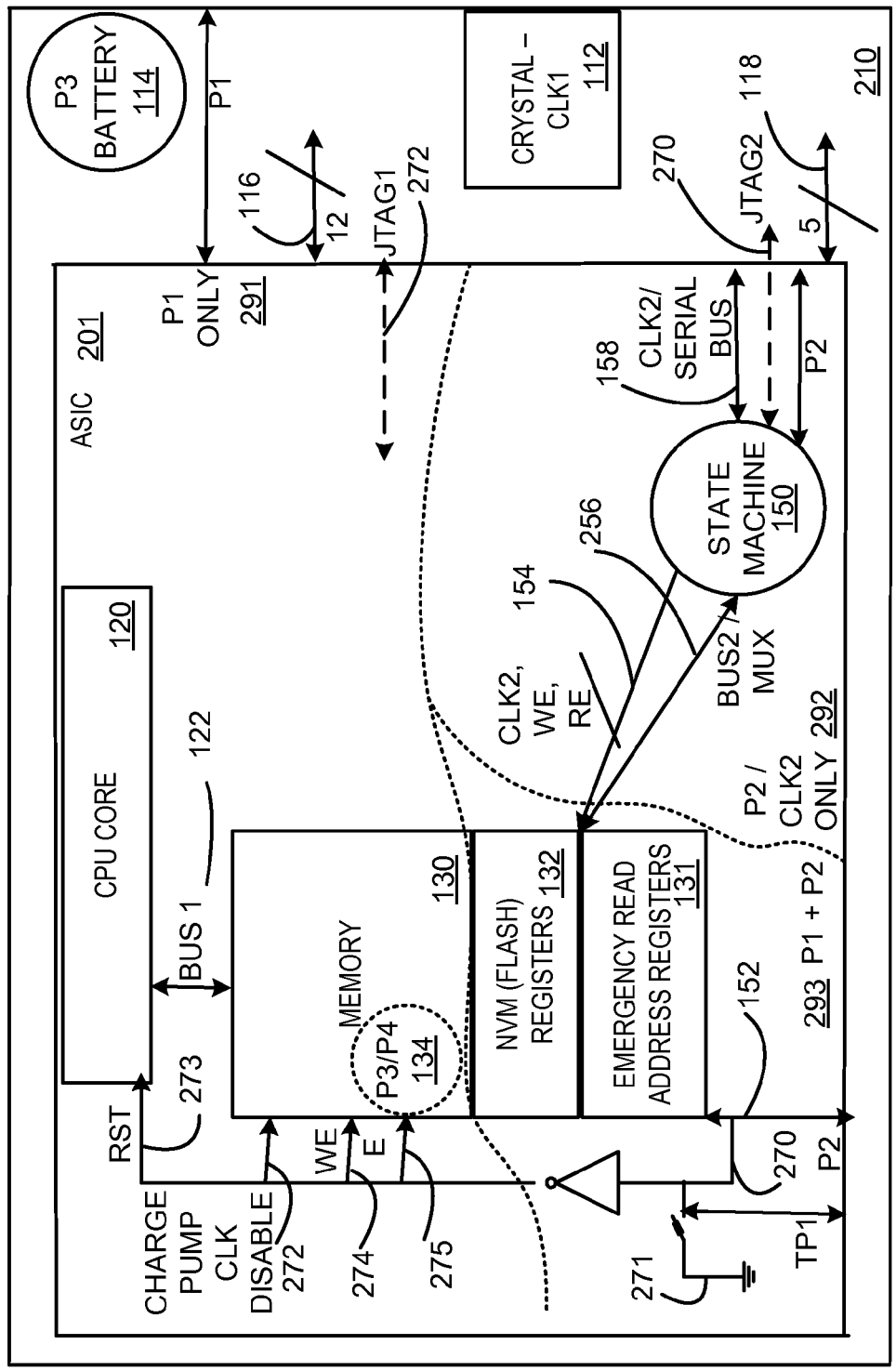
FIG. 2 is a schematic diagram of a system on a chip application specific integrated circuit having a physical partial dual-port nonvolatile memory according to another illustrative embodiment of the present application.

Referring to FIG. 2, a schematic diagram of a system on a chip application specific integrated circuit 201 having a physical partial dual-port nonvolatile memory according to another illustrative embodiment of the present application is shown. Here, the ASIC 201 has defined power areas that overlap in some sub-circuits. Power area 291 includes areas powered by P1 only such as the CPU core 120. Power area 292 includes power from only the P2 emergency power plane and only the backup clock CLK2. Power area 293 includes devices powered by both power planes P1 and P2.

A separate physical Bus BUS2/MUX 256 includes address and data lines required to access at least a part of the memory 130, specifically NVM 131, 132. Because the memory is physically dual ported, we make sure that CPU core 120 or DMA access (not shown) cannot write to the device and then ASIC 201 does not require the additional circuitry to provide busy state signals that are often implemented in dual port memory. When powered by P2, the state machine 150 obtains the emergency read register address range from hard-coded register location 131. The state machine 150 performs and pre-emergency read functions and then reads and serially outputs the valuable data from the selected range of NVM Registers 132.

Here, ASIC 201 is configured to have an automatic disable feature 270 whereby presence of emergency read backup power supply P2 152 drives a gate to disable the write enable WE 274 on at least the section of memory that holds the valuable data and also drives the reset line RST 273 of the CPU Core 120 to ensure that the CPU core does not attempt to access the BUS 122. Furthermore the disable feature 270 will erase a security related battery backed portion of the memory map 134 having battery power P3 and an emergency capacitor reserve P4 to facilitate execution of the erase command E 275.

For example, P4 comprises a storage capacitor for powering the erase circuitry of battery backed memory section 134 in response to erase (E) signal 275. Additionally, commonly-owned, co-pending U.S. patent application Ser. No. 12/257,728, filed Oct. 24, 2008 by Sungwon Moh, et al. entitled Cryptographic Device Having Active Clearing of Memory Regardless of State of External Power is incorporated herein by reference in its entirety and described such memory clear systems that may alternatively be used in the embodiments herein.

As a security feature, circuit 170 will also disable the charge pump clock 272 required for memory write functions. As yet another security feature, fuse 271 will blow when P2 is introduced to the ASIC 201. Before connecting the emergency read test cable to header 118, the user may probe test point 1 TP1 with a low voltage, low current continuity meter to ensure that fuse 1 has not blown. In this embodiment, only P2 powers the state machine components that are not needed to be powered to avoid interfering with normal operation of the ASIC. However, the main power could alternatively power the whole device and P2 may be injected as a backup power source for the limited gates and devices needed to accomplish the emergency read function.

In yet another alternative configuration, the physical second port of the non-volatile memory includes a JTAG circuit JTAG2 270. The ASIC 201 includes a traditional JTAG port JTAG 1 272, that may be disabled after manufacturing test is completed. However, the ASIC also includes JTAG port JTAG 2 270 that is not disabled after manufacturing test. JTAG2 is only powered by P2. Accordingly, a commercially available JTAG test device can be programmed to perform the emergency memory read functions described herein.

Figure 3:
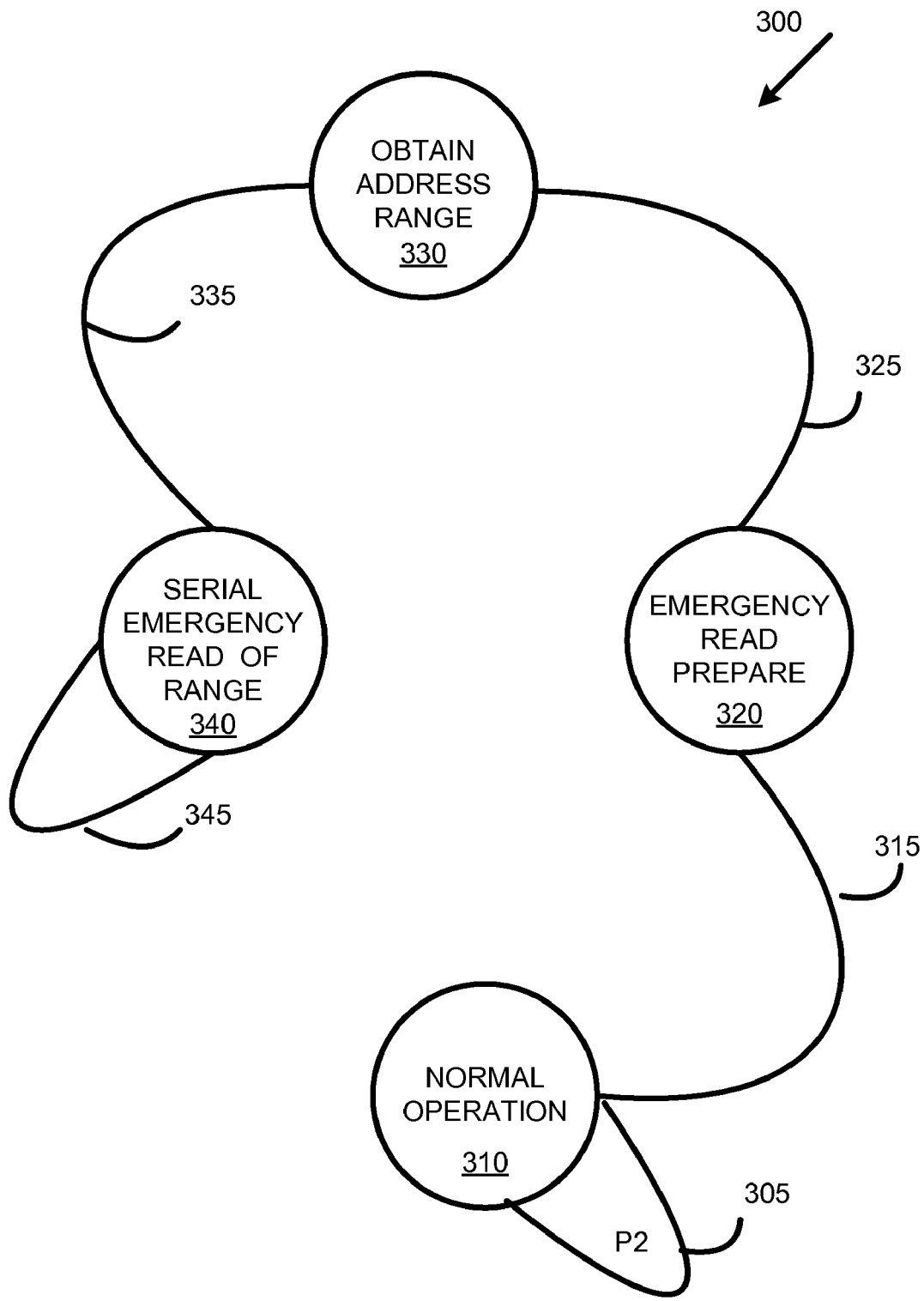
FIG. 3 is a schematic diagram of a state machine of a portion of a system on a chip application specific integrated circuit according to an illustrative embodiment of the present application.

Referring to FIG. 3, a schematic diagram 300 of a state machine 150 of the ASIC 101 of FIG. 1 is shown. The emergency read state machine 150 depicted in diagram 300 comprises a relatively small number of gates of ASIC 101 and powers up in state 110. In state 110, the ASIC 101 is operating normally and the state machine 150 does nothing except stay in its home state on path 305. When an emergency read initiation state change 315 occurs, such as by sensing presence of P2 or other control signal on the emergency read port 118 or even a control signal on port 116, the state machine transitions on path 315 to state 320. In state 320, the state machine processes its pre-read protocol that includes at least disabling of the write capability of the memory registers to be read. Additional optional steps include holding the reset pin of the embedded CPU processor 120, holding down the main clock signal 112 if appropriate in the particular design and erasing secure locations such as cryptographic key storage registers.

Once the state machine completes the pre-read tasks of state 320, the state machine follows path 325 to state 330. In state 330, the state machine obtains the emergency read address range from hard-coded memory registers. Here, the provision of an address range allows the emergency memory read range to be dynamically configurable at least within a sub-range of memory map 130. The state machine then follows path 335 to state 340. In state 340, the state machine performs the emergency read. Here, the necessary bus control is asserted to control the memory bus and the registers are read and serially output over the I2C serial port provided for emergency read functions. For example, the state machine includes at least the start address of the register range and can serially increment the address to process the known or obtained range of registers. The state machine provides the bus control and address information required to read the relevant registers. The state machine optionally includes a buffer to hold the relevant register data while it is serially outputting that data on the I2C channel. Optionally, the registers are actual physical dual port devices and the state machine controls the second read only port to process the emergency read request. The state machine then terminates by staying in state 340 on path 345. Optionally, state 340 continuously outputs the register data until power P2 is removed.

Figure 4:
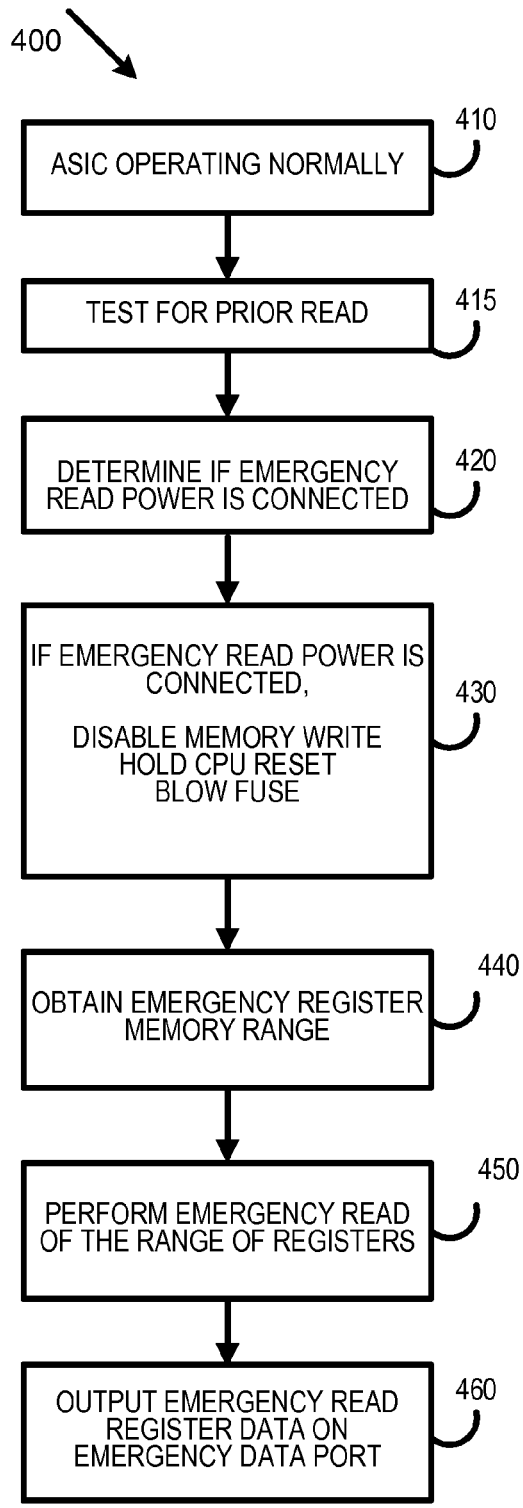
FIG. 4 is a flow chart describing a process for reading non-volatile registers in a partially disabled system on a chip application specific integrated circuit according to an illustrative embodiment of the present application.

Referring to FIG. 4, a flow chart describing a process 400 for reading memory registers in a partially disabled ASIC according to an illustrative embodiment of the present application is shown. In step 410, the process starts with a normally operating ASIC. At some time, portions of the ASIC may fail such that the valuable data is not accessible through the normal USB communications channel of the device. Accordingly, the device may have an emergency read port connected such as through a ribbon cable connection from a test fixture to an emergency read header on the PSD circuit card 110. In step 415, the process tests a security fuse. In step 420, the process determines if the emergency read port cable is connected such as by sensing the presence of power on pin P2 or the other signals on the emergency read port.

In step 430, if the emergency read port is connected, the process performs any pre-emergency read requirements such as erasing any security data including any cryptographic keys, disabling the main CPU core and disabling the memory write capability for at least the memory locations that are to be read. In step 440, the process obtains the emergency read register range. In step 450, the process performs the emergency read of the registers. In step 460, the process outputs the selected register data and may output the data on a serial or parallel bus. In the illustrative embodiments, a standard I2C serial port is used by the emergency read state machine to output the register contents.

Figure 5:
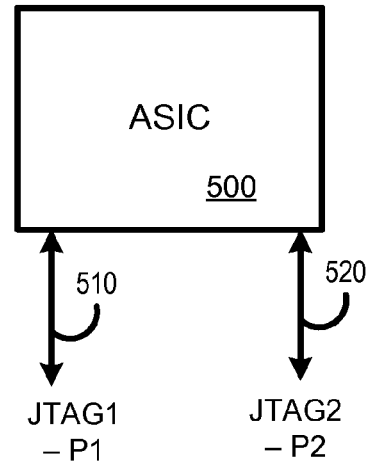
FIG. 5 is a schematic diagram of a system on a chip application specific integrated circuit according to an illustrative embodiment of the present application.

Referring to FIG. 5, a schematic diagram of ASIC 500 according to an illustrative embodiment of the present application is shown. In another alternative embodiment applicable to any of the relevant embodiments herein, the ASIC includes an IEEE standard JTAG subsystem. In one embodiment, the ASIC includes a standard JTAG testing subsystem 510 with JTAG state machine and appropriate pins and registers. In yet an alternative applicable to any of the relevant embodiments herein, the ASIC includes two JTAG ports. The first JTAG port 510 is used to test the processor and the other circuitry of the processor. Because the illustrative embodiment is a single logic integrated circuit solution, the JTAG port is not connected in serial or parallel to other JTAG enabled integrated circuits under test. The first JTAG port is then disabled after the manufacturing test process applied to the ASIC. The second JTAG port 520 is connected to access the relevant memory register locations with a specific JTAG test program designed to read only the valuable data out on the second JTAG channel. The state machine therefore provides a second memory port into the FLASH memory that provides for a serial output of the memory registers in serial fashion over the JTAG2 serial bus. Unlike the first JTAG port, the second JTAG port 520 is clocked by CLK2.

When system power is removed from a device using typical random access memory (RAM), the data stored in the RAM is lost. There are several types of non-volatile memory (NVM) available that maintain the stored data after system power is removed including battery-backed RAM, Traditional small block or byte writable Electrically Erasable Programmable Read Only Memory (EEPROM) is distinguished from the more modern FLASH NVM. Dual port memory however, has typically been used in video display applications such as in dual port Video Ram (VRAM). In an alternative applicable to any of the relevant embodiments herein, the EEPROM memory comprises dual port NVM memory such as dual port EEPROM memory having a primary channel through the system bus and then a secondary read-only channel accessible through the state machine 150 using a second bus.

The processes described herein are programmed in the appropriate assembler language for the CPU processor used such as the embedded ARM 7 series processors. Alternatively, the C or C++ programming language or other appropriate higher level language may be utilized to create the programs resident in memory 130. The emergency read channel includes an I2C serial port with clock and data pins optionally on the 12 line port 116 or on a header used for the invasive emergency read process. The processors run on real-time or other operating systems such as QNX, embedded LINUX or WINDOWS CE stored in memory. In another alternative embodiment applicable to any of the relevant embodiments herein, instead of an ASIC, any other programmable or otherwise customizable integrated circuit such as Field-programmable gate array (FPGA) may be used.

In yet another alternative applicable to any of the relevant embodiments herein, P2 comprises a voltage level that is lower than the primary power voltage level such as ½ core voltage, but sufficient to power the NVM and state machine in a read only process. Similarly, the clocking circuit to the NVM 132 may be multiplexed such that the presence of P2 selects CLK2 for the memory device 132. Accordingly, as another security measure, CLK2 may alternatively be slower than CLK1 such as ½ speed but sufficient to clock FLASH 132 and state machine 150 in a read only mode. The ASIC core may typically run at anywhere from 10-300 Mhz as appropriate and at 1.8 V with 3.3v and 5v power available for other circuits.

Commonly-owned, co-pending patent application Ser. No. 12/347,077, entitled "System and Method for Funds Recovery from an Integrated Postal Security Device" and filed contemporaneously herewith by Robert J. Tolmie, Jr., Douglas A. Clark and Mark A. Scribe is incorporated herein by reference in its entirety. Any of the embodiments therein or portions thereof may be combined with the embodiments herein as would be known by one of skill in the art practicing the teachings herein.

A number of embodiments of the present invention and relevant alternatives have been described. Nevertheless, it will be understood that various modifications may be made without departing from the spirit and scope of the invention. Other variations relating to implementation of the functions described herein can also be implemented. Accordingly, other embodiments are within the scope of the following claims.

We claim:

1. An application specific integrated circuit comprising:
    a core processor used to access a plurality of non-volatile memory registers during normal operation of the circuit;
    a primary bus and control circuit operatively connecting the core processor to the non-volatile memory registers for read and write access;
    a secondary memory access device operatively connected to the non-volatile memory registers, wherein the secondary memory access device erases data in a secure memory location before providing read only access to the plurality of non-volatile memory registers in a non-normal operation read mode.

2. The application specific integrated circuit according to claim 1, wherein,
    the secondary memory access device comprises a state machine, a bus multiplexor and a write disable circuit configured to control access to the plurality of non-volatile memory registers.

3. The application specific integrated circuit according to claim 1, further comprising:
    a first power circuit for powering the core processor, the plurality of non-volatile memory registers, and the primary bus and control circuit;
    a second power circuit for providing power to the secondary memory access device and alternatively powering the plurality of non-volatile memory registers in the non-normal operation read mode.

4. The application specific integrated circuit according to claim 2, further comprising:
    a first clock circuit for providing clock signals to the core processor, the plurality of non-volatile memory registers, and the primary bus and control circuit;
    a second clock circuit for providing clock signals to the secondary memory access device and alternatively providing clock signals to the plurality of non-volatile memory registers in the non-normal operation read mode.

5. The application specific integrated circuit according to claim 3, wherein:
    the secondary memory access device comprises a state machine that includes a relatively small number of gates in the application specific integrated circuit and includes a write disable circuit for disabling write access to the plurality of non-volatile memory registers; and
    the state machine includes a core processor disable circuit for disabling the core processor.

6. The application specific integrated circuit according to claim 5, wherein:
    the write disable circuit is driven when the second power signal is present.

7. An application specific integrated circuit comprising:
    a core processor used to access a plurality of non-volatile memory registers during normal operation of the circuit;
    a primary bus and control circuit operatively connecting the core processor to the non-volatile memory registers for read and write access;
    a dual-port secondary memory access device operatively connected to the non-volatile memory registers to provide read only access to the plurality of non-volatile memory registers in a non-normal operation read mode;

a first power circuit for powering the core processor, the plurality of non-volatile memory registers, and the primary bus and control circuit; and a second power circuit for providing power to the secondary memory access device and alternatively powering the plurality of non-volatile memory registers in the non-normal operation read mode, wherein:

the dual-port secondary memory access device erases a secure memory location before providing read only access to the plurality of non-volatile memory registers.

8. The application specific integrated circuit according to claim 3, wherein:

the dual-port secondary memory access device serially outputs the data stored in the plurality of non-volatile memory registers after the second power signal is detected.

9. The application specific integrated circuit according to claim 1, further comprising a first JTAG subsystem, wherein, the secondary memory access device comprises a second JTAG subsystem.

10. The application specific integrated circuit according to claim 3, further comprising:

a fuse connected to the second power signal is configured to blow when the second power signal is applied.

11. The application specific integrated circuit according to claim 3, wherein:

the dual-port secondary memory access device includes a charge pump clock disable circuit for disabling write access to the plurality of non-volatile memory registers.

12. An application specific integrated circuit comprising:

a core processor used to access a plurality of non-volatile memory registers during normal operation of the circuit;

a primary bus and control circuit operatively connecting the core processor to the non-volatile memory registers for read and write access;

a dual-port secondary memory access device operatively connected to the non-volatile memory registers to provide read only access to the plurality of non-volatile memory registers in a non-normal operation read mode;

a first power circuit for powering the core processor, the plurality of non-volatile memory registers, and the primary bus and control circuit; and a second power circuit for providing power to the secondary memory access device and alternatively powering the plurality of non-volatile memory registers in the non-normal operation read mode, wherein:

the dual-port secondary memory access device reads a memory access address range register before providing read only access to the plurality of non-volatile memory registers indicated by the data read from the memory access address range register.

13. An application specific integrated circuit comprising:

a core processor used to access a plurality of non-volatile memory registers during normal operation of the circuit;

a primary bus and control circuit operatively connecting the core processor to the non-volatile memory registers for read and write access;

a dual-port secondary memory access device operatively connected to the non-volatile memory registers to provide read only access to the plurality of non-volatile memory registers in a non-normal operation read mode and wherein the dual-port secondary memory access device reads a memory access address range register before providing read only access to the plurality of non-volatile memory registers indicated by the data read from the memory access address range register.

14. The application specific integrated circuit according to claim 13, wherein, the secondary memory access device comprises a state machine, a second bus and a write disable circuit configured to control access to the plurality of non-volatile memory registers.

15. The application specific integrated circuit according to claim 13, further comprising:

a first power circuit for powering the core processor, the plurality of non-volatile memory registers, and the primary bus and control circuit;

a second power circuit for providing power to the secondary memory access device and alternatively powering the plurality of non-volatile memory registers in the non-normal operation read mode.

16. The application specific integrated circuit according to claim 14, further comprising:

a first clock circuit for providing clock signals to the core processor, the plurality of non-volatile memory registers, and the primary bus and control circuit;

a second clock circuit for providing clock signals to the secondary memory access device and alternatively providing clock signals to the plurality of non-volatile memory registers in the non-normal operation read mode.

17. The application specific integrated circuit according to claim 15, wherein:

the state machine includes a write disable circuit for disabling write access to the plurality of non-volatile memory registers; and the dual-port secondary memory access device includes a core processor disable circuit for disabling the core processor.

18. The application specific integrated circuit according to claim 17, wherein:

the write disable circuit is driven when the second power signal is present.

19. The application specific integrated circuit according to claim 13, further comprising a first JTAG subsystem, wherein, the secondary memory access device comprises a second JTAG subsystem.

20. The application specific integrated circuit according to claim 15, further comprising:

a fuse connected to the second power signal is detected configured to blow when the second power signal is applied.

21. The application specific integrated circuit according to claim 7, wherein the dual-port secondary memory access device comprises a virtual dual-port secondary memory access device.

22. The application specific integrated circuit according to claim 12, wherein the dual-port secondary memory access device comprises a virtual dual-port secondary memory access device.

23. The application specific integrated circuit according to claim 7, wherein the dual-port secondary memory access device comprises a state machine that includes a relatively small number of gates in the application specific integrated circuit.

24. The application specific integrated circuit according to claim 12, wherein the dual-port secondary memory access device comprises a state machine that includes a relatively small number of gates in the application specific integrated circuit.

25. The application specific integrated circuit according to claim 13, wherein the dual-port secondary memory access device comprises a virtual dual-port secondary memory access device.

26. The application specific integrated circuit according to claim 13, wherein the dual-port secondary memory access device comprises a physical dual-port secondary memory access device.

27. The application specific integrated circuit according to claim 13, wherein the dual-port secondary memory access device comprises a state machine that includes a relatively small number of gates in the application specific integrated circuit.

\* \* \* \* \*